United States Patent [19]
Powell

[11] Patent Number: 5,329,968
[45] Date of Patent: Jul. 19, 1994

[54] SHUTTLE VALVE

[75] Inventor: Walter W. Powell, Sugar Land, Tex.

[73] Assignee: KWW Gesellschaft für Verfahrenstechnik mbH, Düsseldorf, Fed. Rep. of Germany

[21] Appl. No.: 906,152

[22] Filed: Jun. 29, 1992

[51] Int. Cl.$^5$ ............................................. F16K 11/02
[52] U.S. Cl. ............................... 137/625.46; 137/274; 137/276; 251/192; 251/160
[58] Field of Search .................... 137/872, 874, 625.46, 137/876; 251/192, 160, 298, 86

[56] References Cited

U.S. PATENT DOCUMENTS

| | | | |
|---|---|---|---|
| 3,575,376 | 4/1971 | Arvidson | 251/160 X |
| 4,074,889 | 2/1978 | Engel | 251/298 |
| 4,403,626 | 9/1983 | Paul | 137/876 X |
| 4,821,772 | 4/1989 | Anderson | 137/874 X |

Primary Examiner—Gerald A. Michalsky
Assistant Examiner—Thomas M. Sember
Attorney, Agent, or Firm—Anderson Kill Olick & Oshinsky

[57] ABSTRACT

A shuttle valve is described which comprises a valve housing having an inlet and a plurality of outlets. An inner valve assembly is located within an internal cavity which is actuated by a shaft which extends from the internal cavity to a point external from the valve housing. The inner valve assembly comprises a valve disk having a surface which is spherical, at least in part, and a flow elbow, which is located 180° away from the face of the valve disk. The valve disk and the flow elbow are connected to one another and to the shaft. The valve disk is further articulatable. The point which defines the axis of rotation of the shaft and the center point of a phantom sphere defined by the spherical surface of the valve disk, are eccentric, or displaced from one another. Upon the rotation of the valve disk and its contact with a seating surface adjacent the flow passage to be shut off or closed, the eccentricity of the shaft axis and the center point of the phantom sphere creates a torque, upon the continued rotation of the shaft, which is applied to the valve disk and which serves to increase the seating load of the valve disk so as to perfect the seating of the valve disk against the spherical seating surfaces adjacent the flow passage.

27 Claims, 8 Drawing Sheets

SHUTTLE VALVE

FIELD OF THE INVENTION

The present invention relates to a shuttle valve which consists of a valve housing having inlets and outlets for the flow of a fluid or a gas. The present invention provides a shuttle valve assembly wherein the flow of the fluid or gas can be directed or selected to flow from an inlet to a given outlet or outlets with the flow of the fluid or gas being directed with the use of a valve disk and a flow elbow assembly which allows for an improved valve seating, decreased flow losses and various manufacturing and utilization advantages.

BACKGROUND OF THE INVENTION

Shuttle valves are known from the prior art wherein the flow of a fluid or a gas may be selectively controlled so as to direct the flow of same in various directions through a valve or a valve housing. FIGS. 1, 2 and 3 are exemplary of shuttle valves which are known from the prior art. Such shuttle valves make possible the change of the direction of the flow of a fluid or a gas from one flow passage or channel to another so as to selectively direct the flow of the fluid or gas through the shuttle valve.

In FIG. 1, a prior art shuttle valve 10 is illustrated which comprises a valve housing 16, having an inlet 14 and outlets 16 and 18. The inlets and outlets are connected in a flow-through arrangement so as to facilitate the flow of a fluid or gas through the shuttle valve. The direction of flow of the fluid or gas depends on the position of a valve slide 20 which is located within the valve housing. The valve slide 20 is actuated by an external means such as by a hand wheel 22. The valve slide 20, under the control of the hand wheel 22, can be shuttled between the valve seating 24 which is associated with flow passage 50 and the valve seating 26 which is associated with flow passage 60 so as to selectively direct the flow of a medium through the shuttle valve 10.

The prior art shuttle valve of FIG. 1 is undesirable as the sharp turn of the flow of the fluid or gas, which results from the design of said valve, creates a high flow resistance which results in considerable pressure losses in the flow pressure of the fluid or gas. Another disadvantage of the shuttle valve of FIG. 1 lies in the fact that turbulent flows may also result. Further, if the valve is used improperly, the valve slide could assume an intermediate position whereby a fluid or gas flow would exist through both flow passages. The prior art shuttle valve of FIG. 1 may also require numerous and tedious turns of the hand wheel 22 which may further prevent a completely synchronous operation with other shuttle valves.

FIG. 2 illustrates another prior art shuttle valve 10 wherein a rotatable valve arrangement requires the actuation of a locking device 28, which typically needs to be rotated. A shaft 22, which is further connected to an inner housing part 30 and a valve slide 40, can be rotated and the flow of a fluid or gas can be directed from flow passage 60 to flow passage 50 or vice versa. In the prior art shuttle valve of FIG. 2, the equivalent of two 45° elbows are placed back to back in order to complete a flow channel. While this arrangement results in low pressure losses, the actuation of the rotatable valve arrangement is quite complicated. In order to change the direction of the flow of a fluid or gas from flow passage 50 to flow passage 60, or vice versa, the locking device must be actuated in order to move the shaft 22 downwards which, due to the mechanical connection between the shaft and the inner housing part 30 and valve slide 40, must be moved downward in order to move the inner housing part 30 and the valve slide 40 downward and away from the valve seats adjacent the flow passages.

The valve slide 40 is connected to the inner housing part 30 and closes off the opposite flow passage. The inner housing part 30 and valve slide 40 arrangement are rotated by the rotation of shaft 22 so as to align these elements with their respective flow passages upon which time the shaft 22 and the inner housing part 30 and valve slide 40 arrangement are then moved upwardly by the rotation of the locking device 28 so as to cause the inner housing 30 and the valve slide 40 to be seated against the seating surfaces of their respective flow passages. The downward movement of the inner housing 30 and valve disk 40 arrangement is required so that this rotation can be facilitated.

The prior art shuttle valve 10 of FIG. 2 is disadvantageous because an actuation means is required to actuate the locking device 28 in order to move the shaft 22 and the inner housing 30 and valve slide 40 arrangement downwards and away from the valve seats. Further, a second actuation means is necessary to rotate the shaft 22 so as to rotate the inner housing 30 and valve slide 40 each from one flow passage to the opposite flow passage. It is most difficult to automate this above described double actuation operation and for this reason, the shuttle valve of FIG. 2 is undesirable. Further, the inner valve, which comprises inner housing 30 and valve slide 40, is comprised of several components which requires costly assembly and maintenance procedures.

FIG. 3 illustrates yet another prior art shuttle valve 10 which is the subject of U.S. Pat. No. 4,964,435. In the prior art shuttle valve 10 of FIG. 3, a shaft 22, having a square head 240 is utilized to rotate bushings 98 and 100. The portion of shaft 22 carrying bushings 98 and 100 is eccentric to the upper centerline of shaft 22 so that the rotation of the bushing 98 will also be eccentric. A lever 82 is connected to the bushing 98 and has connected thereto a valve disk 20. The lever 82 can rotate on the bushing 98. In order to keep the lever 82 from rotating too easily, belleville washers 136 are utilized which act as a spring and which are tightened by nut 142 on shaft 22.

As the nut is tightened, the belleville washers are compressed and squeeze bushings 98 and 100 on lever 81. This action causes the shaft 22 to turn lever 82 and therefore causes the valve disk 20 connected thereto to rotate. Once the valve disk 20 is rotated so as to align with the valve seat corresponding to the flow passage to be shut off, the eccentric portion of the shaft 22 serves to push the valve disk 20 up against the valve seat corresponding to the flow passage. The shuttle valve of FIG. 3 requires rotation of the shaft 22 by approximately 270°, which includes an approximately 180° rotation from alignment with one flow passage to the opposite flow passage and the further rotation of the shaft so as to facilitate valve disk seating and unseating.

The shuttle valve 10 of FIG. 3 is disadvantageous as actuators for the 270° rotation are not commonly available and further because the presence of the moving parts of the inner assembly in the flow path results in undesirable flow resistance and increased flow losses. The shuttle valve of FIG. 3 is also undesirable as it requires travel stops to aid in the alignment of the valve disk 20 with the flow passage and further because no positive linkage exists between the shaft 22 and the valve disk 20 linkage.

The shuttle valve of the present invention addresses the shortcomings of the prior art shuttle valves described herein and provides a shuttle valve which can operate with more commonly available actuators such as 180° actuators or actuators that require less rotation while at the same time providing a means by which to provide a positive linkage between the actuator shaft and the inner valve assembly part while at the same time providing a shuttle valve having reduced pressure losses and reduced manufacturing and maintenance costs.

SUMMARY OF THE INVENTION

The shuttle valve of the present invention comprises a valve housing which may be cast as a one piece structure and which has at least one inlet and a plurality of outlets. Flow passages extend through the shuttle valve so as to provide a flow-through path for a fluid or a gas. An internal cavity is also provided wherein an inner valve assembly is located which is controlled by an actuating means such as a shaft which is further actuated either manually or automatically by an external actuation device. The base portion of the valve housing and the outlet portions contain a connecting means for connecting the shuttle valve to an external system.

The valve housing encloses an internal cavity of the shuttle valve assembly which houses all of the moving parts of an inner valve assembly and which serves to divert the flow of a fluid or a gas from the at least one inlet to one or more of a plurality of flow passages or outlets. The inner valve assembly comprises a flow elbow which is utilized as a flow director from the inlet to an outlet and a valve disk which is located 180° from the upper side opening of the flow elbow. The valve disk has a surface which is spherical, at least in part, and which enables the valve disk to seat with a spherical seating surfaces adjacent to the flow passages. The valve disk is employed to block the flow passage of the shuttle valve which is not to be utilized.

A point location defines the center point location of a phantom sphere which corresponds to the spherical surface, or portion thereof, of the valve disk. The spherical seating surfaces adjacent to the flow passages have spherical surfaces which correspond to the spherical surface of the valve disk. A center point location of the axis of rotation of the valve shaft is also defined in the shuttle valve. The center point location of the axis of rotation of the shaft and the point location of the center point of the phantom sphere, are not coincidental with one another, but are rather, eccentric, or displaced from one another by a distance.

The valve disk and the flow elbow, which are connected to one another are rotatable within the internal cavity via the shaft to which they are both also connected. The shaft, which extends to the exterior of the shuttle valve, is connected to an external actuation device.

The valve disk must also be able to be articulated so that a perfect seating with the seating surfaces adjacent the flow passages can be attained. Valve disk articulation will be caused by a seating force developed on the valve disk subsequent to its coming into contact with the seating surface adjacent the flow passage.

When it is desired to change the direction of flow of the fluid or gas through the shuttle valve, the shaft is rotated by the external actuator. Upon shaft rotation, the valve disk becomes unseated from the seating surface adjacent the flow passage and begins to rotate within the inner cavity. As the valve disk rotates, the flow elbow also rotates in the same direction as a result of being linked with the valve disk. This combined simultaneous movement results in the rotation of the flow elbow towards the flow passage previously sealed by the valve disk. The shaft will rotate and continue to cause the rotation of the valve disk and flow elbow combination until the spherical surface of the valve disk comes into contact with the spherical seating surface adjacent the flow passage which is to be sealed off or closed.

The eccentricity or displacement of the center point locations corresponding to the axis of rotation of the shaft and the center point of the phantom sphere provides for a torque to be applied to the valve disk upon the application of further torque to the shaft. The applied torque converts to a drag along with a seating force which is perpendicular to valve disk and which serves to direct the valve disk towards the spherical seating surface adjacent the flow passage. The valve disk will swivel during this seating approach until the alignment between the spherical surface of the valve disk and the spherical seating surface is perfected. This aligned or perfected seating thereby seals off the flow passage and prevents the flow of fluid or gas through the sealed flow passage.

Simultaneously with this action, the flow elbow will come into alignment with the opposite flow passage. In this manner, the shuttle valve provides the change of flow of the fluid or gas from and between flow passages with a minimal pressure drop or pressure loss occurring therethrough. The above described process is repeated in the opposite direction when it is desired to once again change the flow passage which is selected to be made active or opened.

The shuttle valve of the present invention requires no more than a 180° rotation of its inner valve assembly in order to perform the described function. Further, the components of the inner valve assembly may be inserted into, and assembled within the internal cavity. This leads to numerous cost and manufacturing advantages.

Accordingly, it is an object of the present invention to provide a shuttle valve which has improved flow characteristics and which is characterized by decreased pressure losses.

It is another object of the present invention to provide a shuttle valve which requires an actuation device which requires 180° or less of rotation in order to perform its function.

It is another object of the present invention to provide a shuttle valve having inner parts designed so that they can be inserted into and assembled within the internal cavity.

It is yet another object of the present invention to provide a shuttle valve which provides for the inexpensive assembly and maintenance of its internal mechanism.

It is yet another object of the present invention to provide a shuttle valve having a positive linkage between its actuation means and the inner valve housing assembly so as to minimize mechanical failure during its operation.

Other objects and advantages of the present invention will be made apparent to those persons skilled in the art after a review of the Description of the Preferred Embodiment taken in conjunction with the Drawings which follow.

DESCRIPTION OF THE PREFERRED EMBODIMENT

Figure 1:
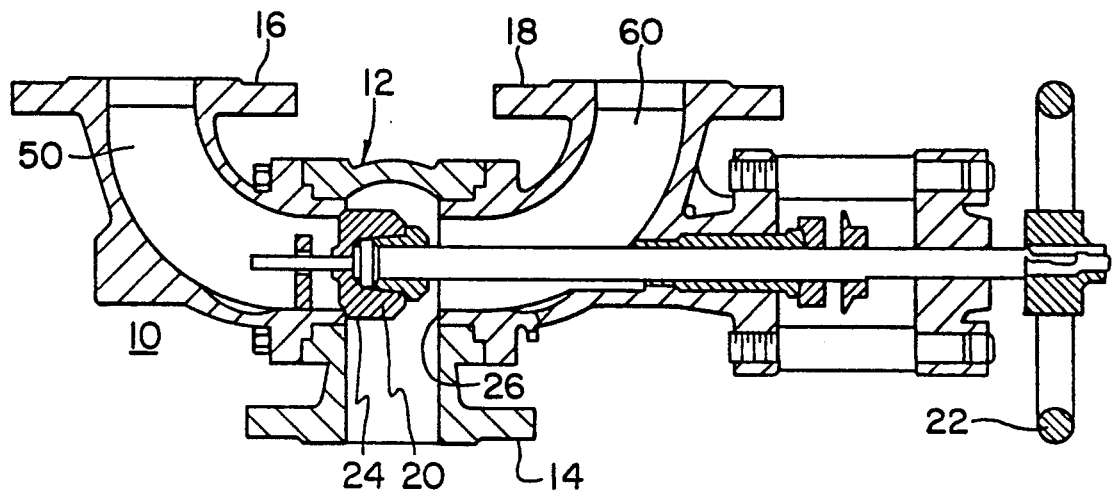
FIGS. 1, 2 and 3 illustrate shuttle valves known from the prior art.
Figure 2:
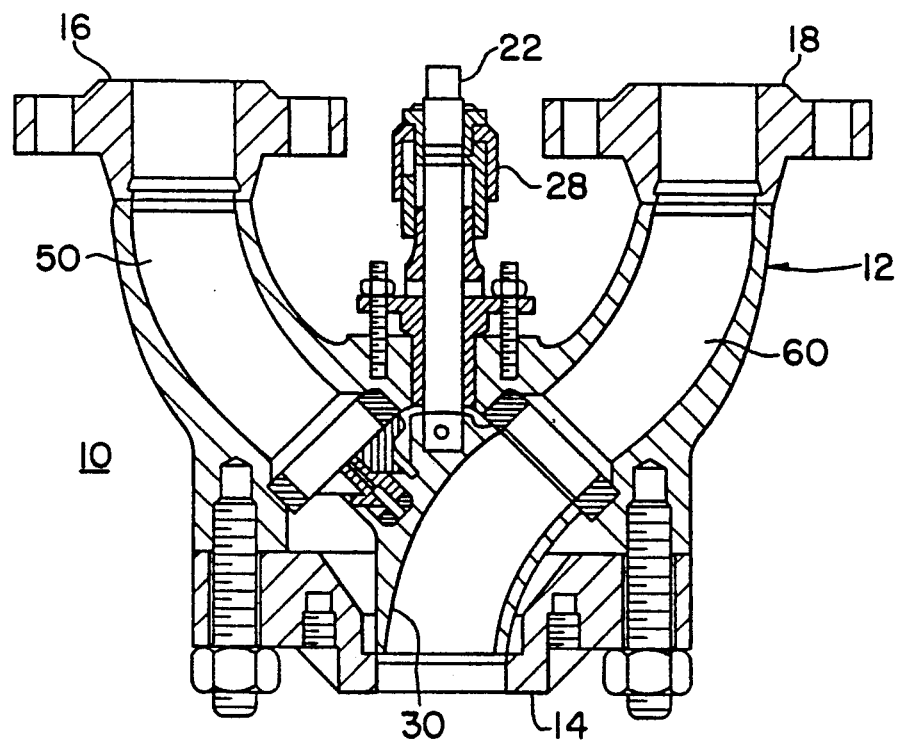
Figure 3:
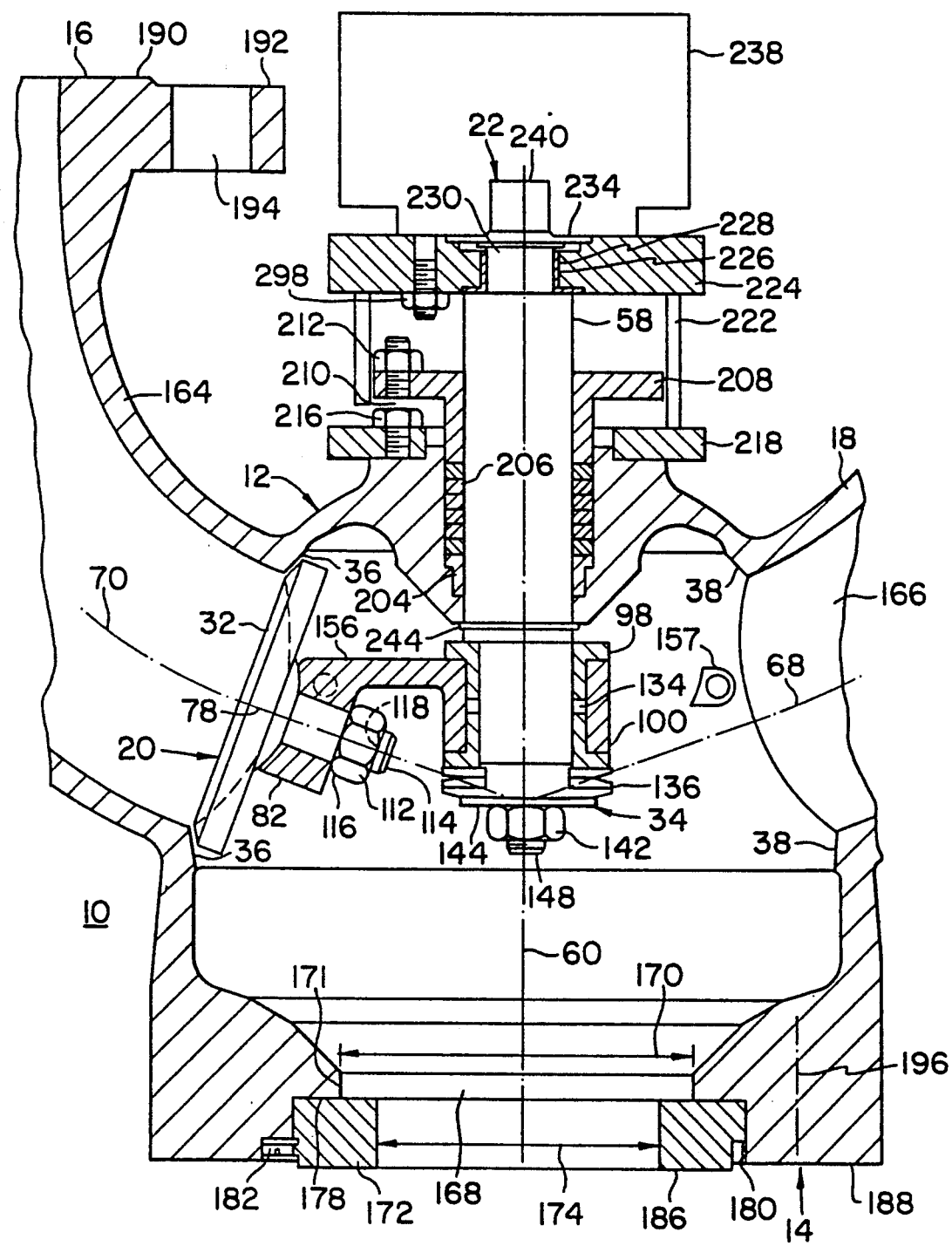
Figure 4:
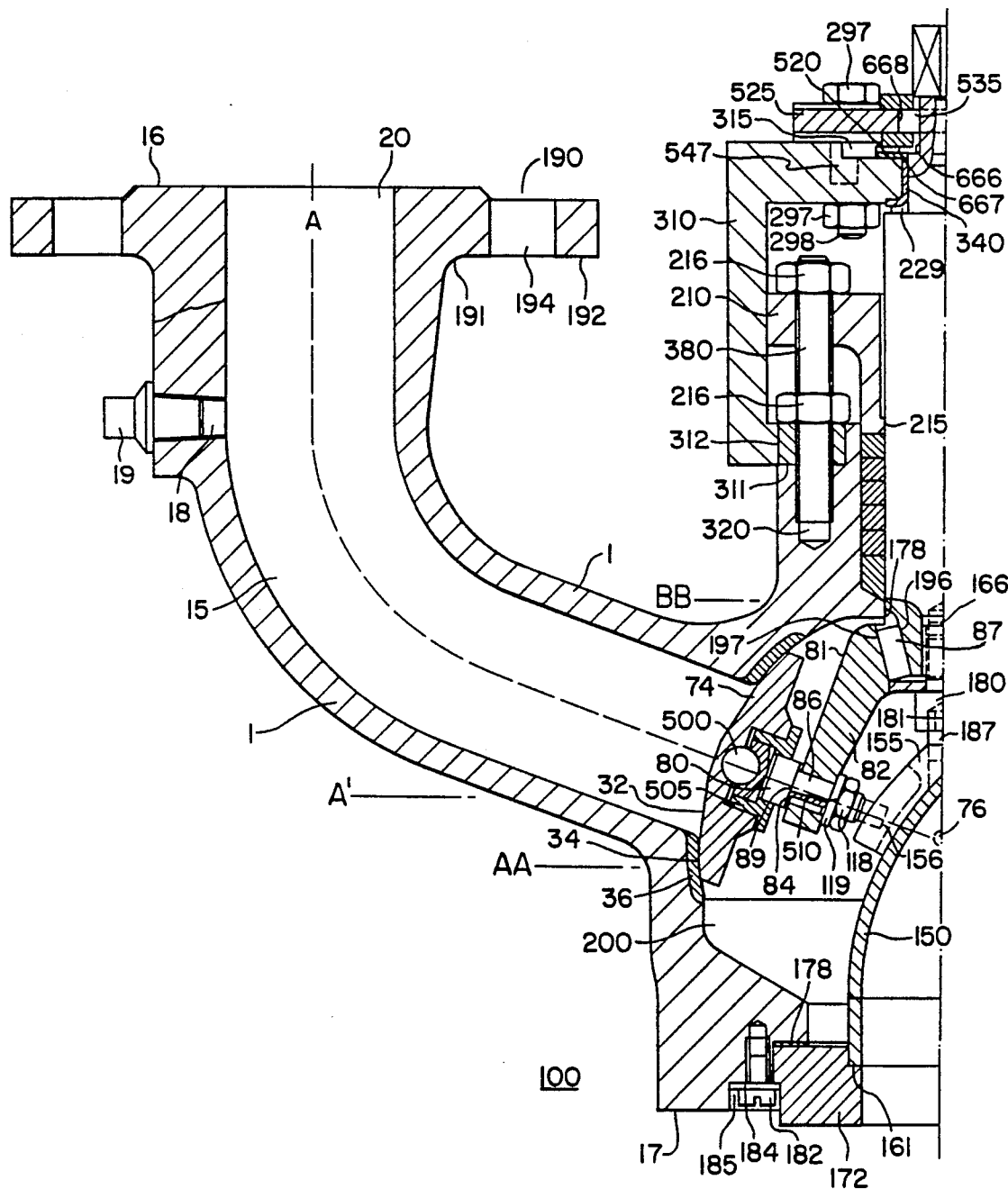
FIG. 4 illustrates the shuttle valve which is the subject of the present invention.
Figure 4:
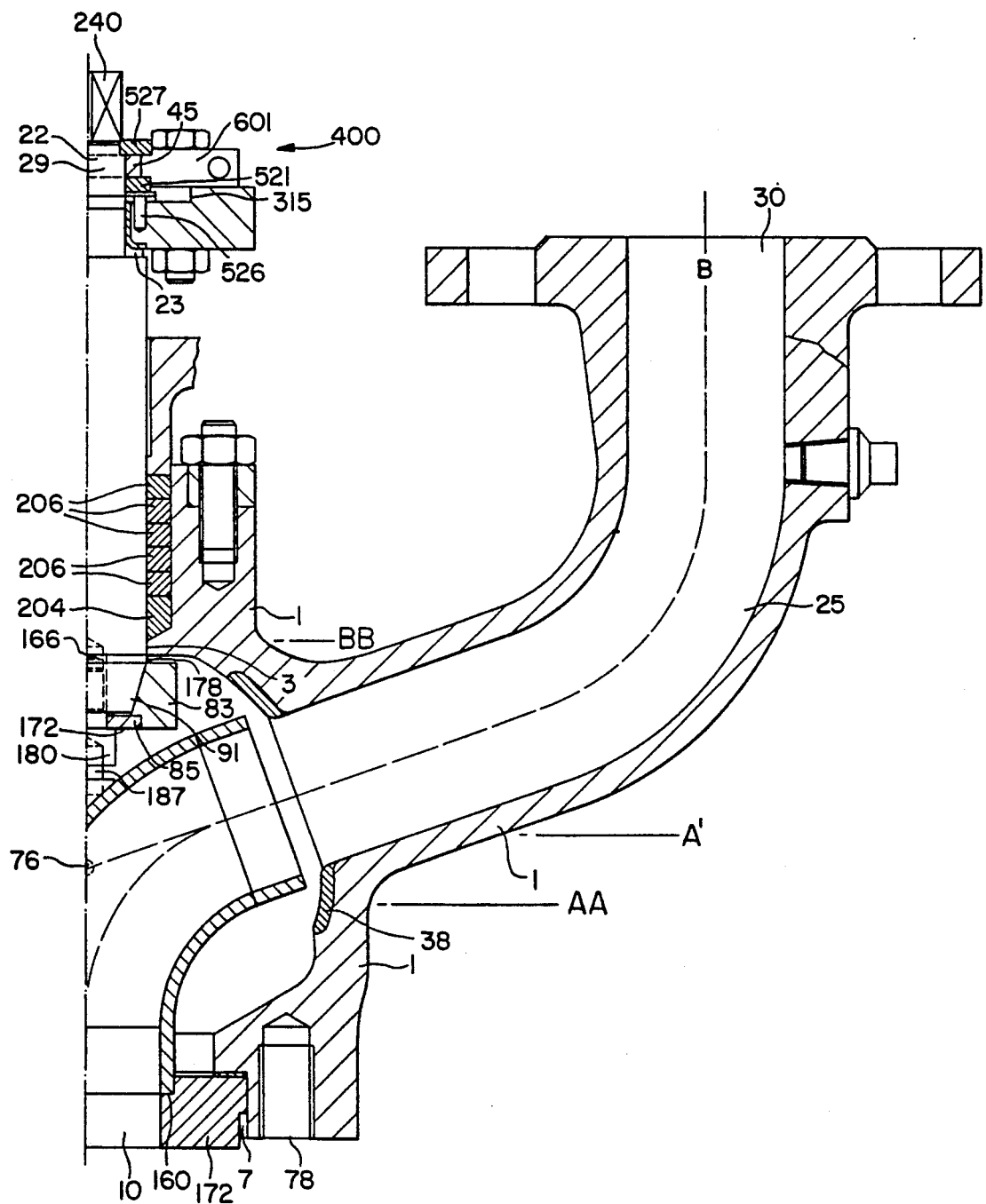
Figure 4A:
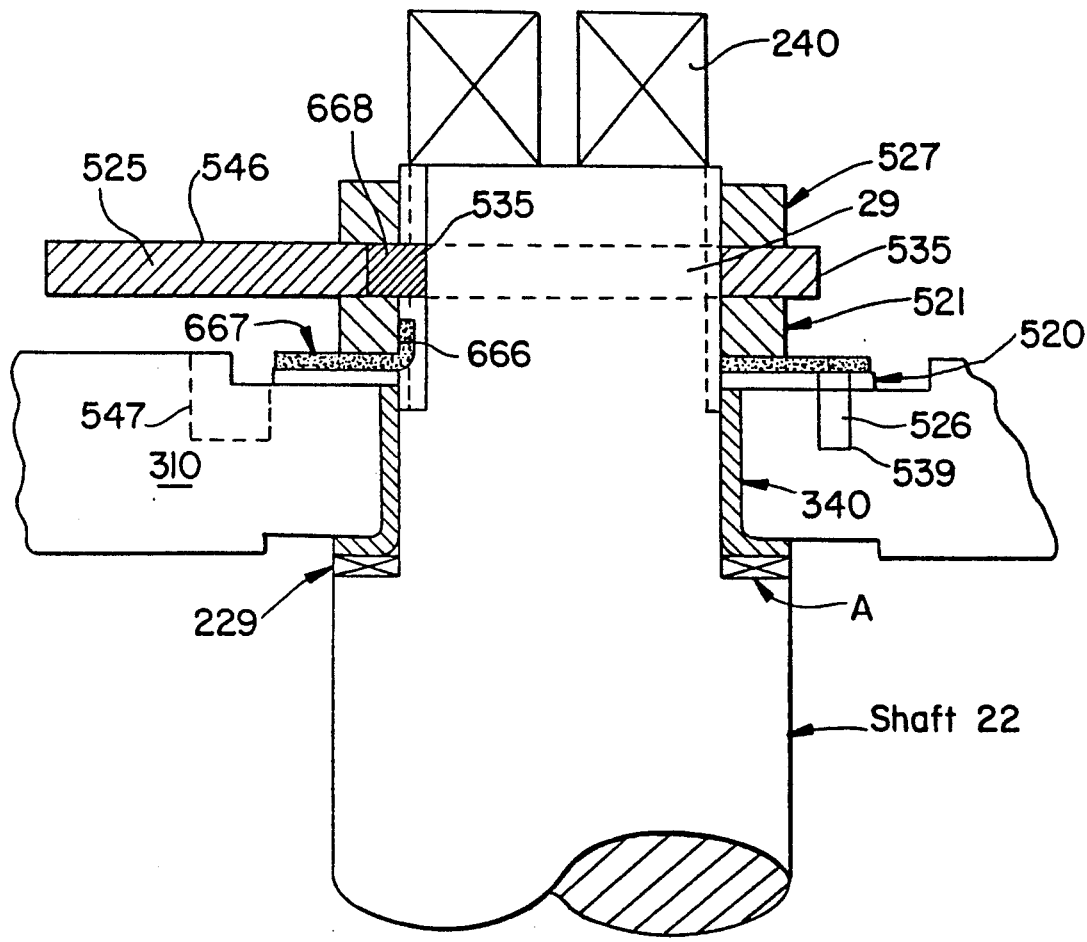
FIG. 4A is an enlarged illustration of the top portion of the shuttle valve of the present invention.
Figure 5:
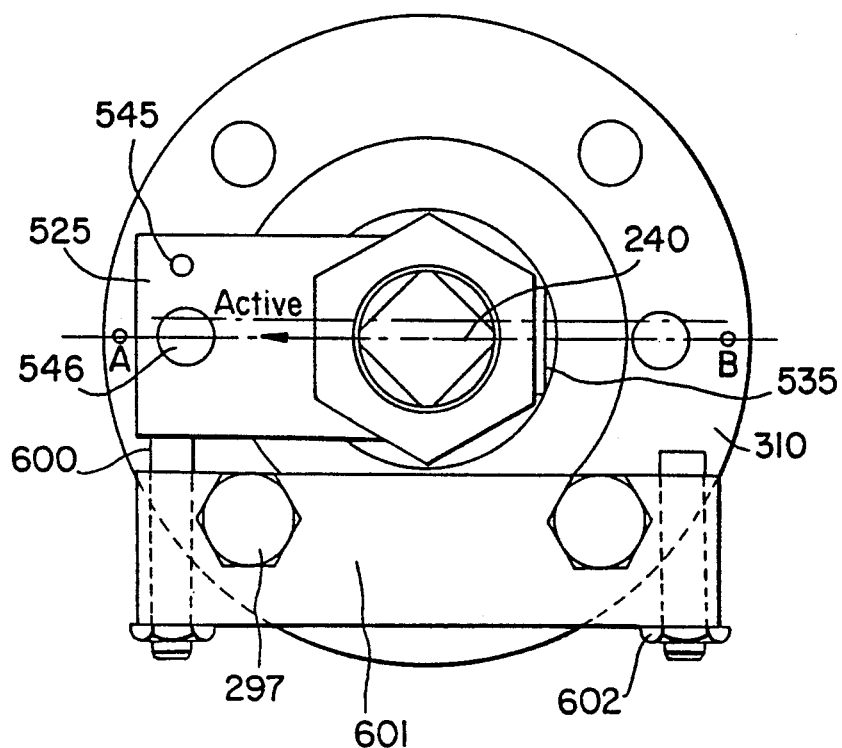
FIG. 5 illustrates a top view of the shuttle valve of the present invention.

The shuttle valve of the present invention is illustrated in FIG. 4 and is denoted generally by the reference numeral 100. An enlarged view of the top portion of the shuttle valve 100 is illustrated in FIG. 4A. A top view of the shuttle valve 100 is illustrated in FIG. 5. Referring to FIG. 4, the shuttle valve 100 comprises a valve housing 1 which is cast as a one piece structure and, depending upon the application of the shuttle valve 100, may be composed of steel, stainless steel, aluminum, plastic or any other suitable material.

The valve housing 1 is shown in FIG. 4 to be of a Y-shape and having side arms A and B. An inlet (outlet) 10 is located at the base of shuttle valve 100 and two outlets (inlets) 20 and 30 extend therefrom. Outlet (inlet) 20 is located at the end of side arm A of the shuttle valve 100 and outlet (inlet) 30 is located at the end of side arm B of the shuttle valve 100, as shown in FIG. 4. Flow passage 15 extends from the outlet (inlet) 20 of side arm A inward towards the internal cavity 200 of the shuttle valve 100 while flow passage 25 extends from outlet (inlet) 30 of side arm B inward towards the internal cavity 200 of the shuttle valve 100. Inlet (outlet) 10 and outlets (inlets) 20 and 30 may serve as both inlets or outlets depending upon the desired application. They are referred to in the alternative, in parenthesis, so as to indicate their dual functions and their respective assignments.

Outlets (inlets) 20 and 30 have flanges 190 at their end faces. The flanges 190 comprises inner flange component 191 and outer flange component 192. The flanges 190 also have a bore 194 extending therethrough as shown in FIG. 4 so as to facilitate the insertion of a bolt or other connecting or fastening means (not shown) which is employed to connect the respective side arm of the shuttle valve 100 to an external connector or system.

Located in each of the side arms A and B are pressure relief ports 18 wherein pressure relief plugs 19 may be inserted. Pressure relief plugs 19 may be of any type or form as long as they can be easily inserted and removed from the pressure relief ports 18. A hand valve which is welded or screwed in place may also be suitable as a pressure relief plug 19.

The flanges 190 which are located at the top of outlets (inlets) 20 and 30 have a top surface 16, as shown in FIG. 4. The base portion of the valve housing 1 which is adjacent to inlet (outlet) 10 has a base recess 7 therein wherein a nozzle 172, which has an opening which corresponds to inlet (outlet) 10, is seated as shown in FIG. 4. Nozzle 172 is seated within recess 7 adjacent the valve housing 1 with a gasket 178 interposed therebetween. The nozzle 172 is retained, either permanently or temporarily, such as during transport, by one or more fasteners 182 which may be a bolt or screw or any other suitable fastening device which is inserted either via threads or by some other means into bores 183 located in the valve housing 1. The bores 183 may have internal threads for receiving the fasteners 182 such as a threaded bolt or a machine screw. The valve housing 1 preferably has a recess 185 so as to receive the head of the fastener 182 so that it does not protrude beyond a surface face 17 of the base of the valve housing 1.

As illustrated in FIG. 4, the fasteners 182 retain the nozzle within the recess of the valve housing 1 by means of washers 184. While the nozzle 172 is described as being seated and retained in the above manner, it should be noted that other designs and methods for seating and retaining nozzle 172 may be employed. For example, in addition to one or more fasteners 182 being employed, said fastener may be inserted into the valve housing 1 via a bore (not shown) in the nozzle 172.

The base portion of the valve housing 1 also contains a connecting bore 78 which may be utilized as a means for receiving a fastening device (not shown) which may be employed to connect the base portion of the valve housing 1 to an external connector or system. In this regard, bore 78 may have internal threads for receiving a bolt or machine screw or other threaded fastening device.

The valve housing 1 encloses an internal cavity 200 of the shuttle assembly which houses all of the moving parts of the valve assembly and which serves to divert the flow of a fluid or a gas from inlet (outlet) 10 to either outlet (inlet) 20 or outlet (inlet) 30 or vice versa. The valve assembly comprises a flow elbow 150 which is utilized as a flow connector from the inlet (outlet) 10 to either outlet (inlet) 20 or outlet (inlet) 30 or vice versa. The flow elbow 150 is seated within a circular recess 160 which is located on the internally directed side of the nozzle 172 and is freely rotatable therein. Cavity 200 is fully pressurized at all times. In addition, the shuttle valve is designed so that there exists a clearance at the end of flow elbow 150 which is opposite the inlet (outlet) 10 and the inner wall of the housing 1 adjacent the flow passages.

Located 180° across from the upper side opening of the flow elbow 150 is a valve disk 74 which has a spherical surface 34 at least in part, on the face 32 of the valve disk at those portions of the valve disk 74 adjacent the seating surfaces 36 and 38 of the inner side walls adjacent the flow passages 15 and 25, respectively. In this manner, in order to facilitate machining, the entire valve disk face 32 need not be spherical. Valve disk 74 is employed to block the flow passage in the side arm of the shuttle valve 100 which is not in use. In this manner, if the flow elbow 150 is connected so as to provide a flow of a fluid or a gas from inlet (outlet) 10 to outlet (inlet) 30 through side arm B, the valve disk 74 will block the flow passage 15 which is associated with outlet (inlet) 20 in side arm A. The valve disk 74 and the flow elbow 150 form only two components of the valve assembly. The remainder of the components which comprise the valve assembly will now be described in further detail with reference to FIG. 4.

The valve assembly, as hereinbefore noted, comprises a valve disk 74 which has, at least in part, a spherical surface 34 on its face 32. The inside area or inner region of the face 32 of the valve disk 74, between the seating surfaces 34, may be relieved in order to facilitate the machining processes employed in manufacturing the valve disk 74. A point location 76 defines the center of a phantom sphere which corresponds to the spherical face 34 thereof of the valve disk 74. Point 76 is a phantom point as no real sphere is present in the internal cavity 200. The significance of the center point 76, will be made clearer in the description of the operation of the shuttle valve 100. The portions of the inner walls of cavity 200 which are adjacent to the entrance locations to flow passages 15 and 25, which correspond to outlets (inlets) 20 and 30, respectively, also have spherical seating surfaces 36 and 38 with said spherical seating surfaces corresponding to the spherical surface 34 of the valve disk 74. In this regard, spherical surface 36 corresponds to passageway 15 while spherical surface 38 corresponds to passageway 25. Surfaces 36 and 38 may be composed of any suitable material which will provide an effective valve seating with the surface 34 of the valve disk 74.

Figure 6B:
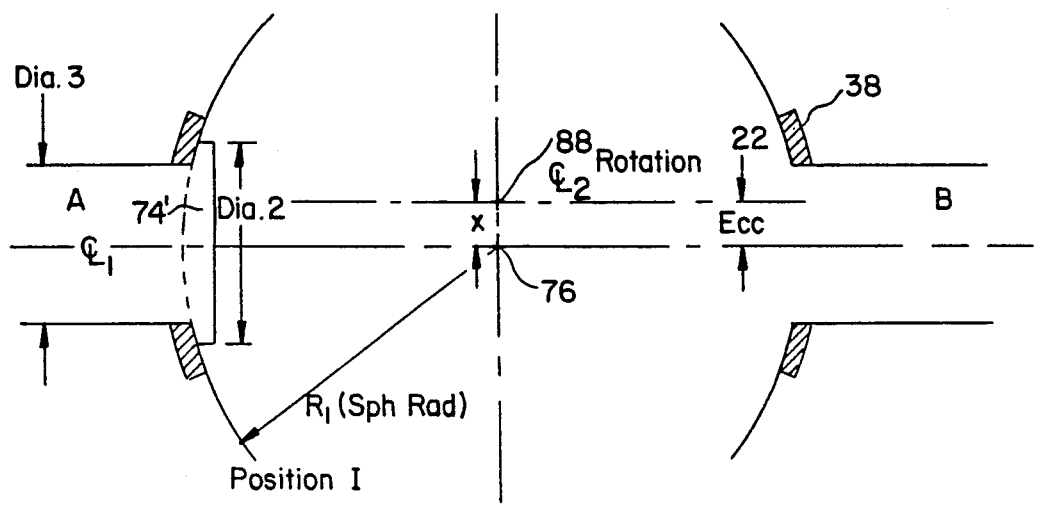
FIG. 6B illustrates diagrammatically a top view of a section of an alternate embodiment of the shuttle valve of FIG. 4 taken along line A'—A'.
Figure 6A:
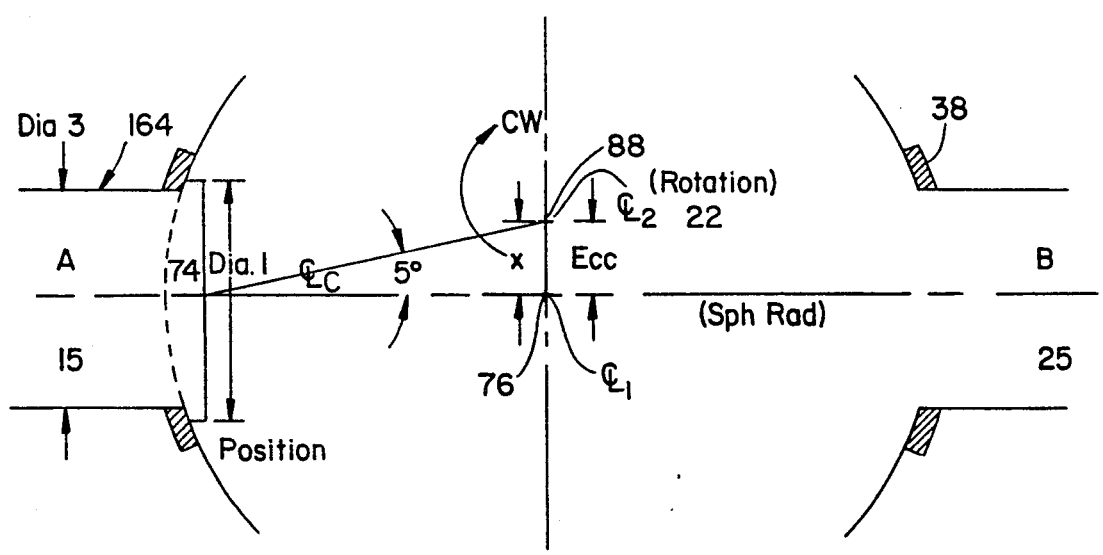
FIG. 6A illustrates diagrammatically a top view of section of the shuttle valve of FIG. 4 taken along line A'—A'.

The valve disk 74 and the flow elbow 150 are rotatable within the internal cavity 200 by a shaft 22 which extends to the exterior of the shuttle valve 100 and which is connected to an external actuator such as a hand-operated wrench (not shown) or other suitable actuation device. The actuation device may be of an automatic or of a manual type. When it is desired to change the flow of a fluid or gas from one side arm to the opposite side arm, the shaft 22 via the external actuator, is rotated. Rotation of the shaft 22 will cause the rotation of the valve disk 74 and the flow elbow 150 about the axial point centerline of shaft 22 which is denoted by reference numeral 88 as shown in FIGS. 6A and 6B and which will be described in more detail below. Rotation of the valve disk 74 will continue from one side of the internal cavity 200 to the other side until the valve disk 74, through its spherical surface 34, comes into contact with the seating surface 36 or 38 adjacent the flow passage 15 or 25, respectively, which flow passage is desired to be sealed or closed.

Upon the seating of valve disk 74, the flow passage on which it seats will be closed off from the flow of the fluid or gas. Simultaneously, with the seating of valve disk 74 against the surface of the flow passage, the flow elbow 150 will be rotated until it comes into alignment with the flow passage which has been chosen to be active, or open, and facilitates the flow of the fluid or gas through the shuttle valve 100. In order to operate in accordance with the present invention, valve disk 74 must be articulated so as to assume a perfect alignment and therefore a more perfect seating with the seating surfaces 36 or 38 openings of the respective flow passage which is to be shut-off or closed. In this manner, the valve disk 74 may be seated more effectively against the spherical surface 36 or 38 of the internal cavity adjacent the flow passage 15 or 25, respectively.

Valve disk 74 is accordingly connected to an articulation ball 500 which is rotatably mounted on a disk axis 510. In this manner, valve disk 74 movement is facilitated. Axis 510 is the centerline of shaft 86. Angular rotation of the valve disk 74 about the articulation ball 500 will be caused by a force developed on the valve disk 74 subsequent to its coming into contact with the seating surface 36 or 38 located on the wall of the internal cavity 200. In this manner, a perfect alignment and a more effective seating of the valve disk 74, through spherical surface 34, against the seating surface 36 or 38 is established. The disk shaft 80 is connected to valve disk 74 with a bushing 511 located therebetween. A locking pin 505 secures the bushing 511 to the valve disk 74 after the bushing 511 is tightened into the valve disk 74. The clearance between the bushing 511 and the disk shaft 80 determines the amount of freedom provided the valve disk 74 as it rotates about the disk shaft 80. Valve disk 74, along with the articulation ball 500, is connected via bushing 511 and disk shaft 80 to lever 82.

Lever 82 also comprises a hub 83 which is connected to the shaft 22. Lever 82 has a bore 86 extending therethrough for receiving the valve disk shaft 80. Lever 82 also has a face 81 which faces the inner wall of the internal cavity 200. The valve disk shaft 80 is inserted through the bore 86 in lever 82. A valve shim 84 is located in between the face 81 of lever 82 and the surface 89 of the valve disk shaft 80 which is adjacent the surface 81 of the lever 82. The shim 84 is utilized in order to provide manufacturing adjustments during assembly.

As indicated above, the clearance that exists between bushing 505 and the valve disk shaft 80 determines the amount of freedom of rotation of the valve disk 74. The freedom of rotation of valve disk 74 is limited to slightly more than that rotation required for the valve disk 74 to seat against the spherical surfaces 36 and 38 adjacent to the entrances to flow passages 115 and 25 on side arms A and B, respectively. The disk shaft 80 is fastened to the lever 82 by a lock nut 118 with a washer 119 placed therebetween so as to provide a more effective and problem-free connection.

The flow elbow 150 has formed therewith, or connected thereto, along its side adjacent the valve disk 74, a connection structure 155 which has a slot 156 which runs vertically therein along its lower portion as illustrated in FIG. 4. Further, connecting rod 157 extends upwards from structure 155 along the axis of rotation of shaft 22. It is important to note that while structure 155 is formed of a single component in the preferred embodiment, in larger valves, structure 155 may be fabricated from a plurality of components. The valve shaft 80 fits within the slot 156 of the connection structure 155 of the flow elbow 150 and serves to rotate the flow elbow 150 about a sloped axis which runs between the axis of rotation of the shaft 22 and the axis of bushing 172 as the valve disk 74 is rotated such as when it is desired to select a different flow passage.

Lever 82 is connected via lever hub 83 to the lower end of shaft 22 as shown in FIG. 4. As shown, the hub 83 of lever 82 is fit upon the tapered lower end of shaft 22. A recess 85 exits and is centrally situated at the lower portion of the hub 83. Further, a bore 166 exits through the lower end of shaft 22. A washer 172 is fit within the recess 85 of the hub 83. A retaining bolt 180, having a head portion which has a bore in the center therein is utilized to connect the hub 83 of lever 82 to the shaft 22 as shown. It should be noted that hub 83 is preferably circular and has a bore 91 which is shaped to accommodate the lower end of shaft 22 and the recess 85. In addition to the embodiment described herein, other properly designed and indexed connections between the shaft 22 and the lever 82 may also be employed.

Bolt 180 is fastened within the bore 166 that runs axially through the lower end of shaft 22 by means such as internal threads. Bolt 160 extends upwards within bore 166 of shaft 22 to a region where shaft 22 has a uniform radius as shown. By tightening retaining bolt 180 the hub 83 of lever 82 is securely fastened to the shaft 22. Key 87, fits in a slot 196 in shaft 22 and coacts within an accommodation slot 197 of hub 83 and serves to key the rotation of the hub 83 and lever 82 to the rotation of the shaft 22. In this manner, the lever 82 will rotate so as to correspond to the rotation of shaft 22.

Bolt 180 has a head with a bore 181 centrally located therein. Connecting rod 187 fits within bore 181 of bolt 180. In this manner, flow elbow 150 is indexed to the axis of rotation of the shaft 22. This serves to ensure a proper guidance of the flow elbow 150 where same is connected to the shaft 22. The lower guidance of the flow elbow is provided by the nozzle 172.

As described thus far, the rotation of valve disk 74 via lever 82 will cause the rotation of flow elbow 150. This rotation is facilitated by the interconnection of the valve disk 74 and the flow elbow 150 as described above. A wire ring 178 is located between the top of hub 83 and the inner wall of cavity 200 on shaft 22 so as to prevent the ejection of the shaft 22 inadvertently should upper support structure 310 be removed while the shuttle valve 100 is pressurized. In this manner, wire ring 178 provides a safety means to prevent injury to operating personnel as well as to prevent damage to the shuttle valve 100.

Shaft 22 extends, from its connection to hub 83 in the internal cavity 200 of the shuttle valve 100, upwards through the shaft bore 3, which is located in the center of the valve housing 1 and between side arms A and B. Shaft 22 terminates in a head 240 at a location external to the shuttle valve 100.

The structure of shaft 22 will now be described in more detail. The head 240 of shaft 22 is preferably shaped as a square in order to provide a convenient and positive means by which to connect the shaft 22 to an external actuator (not shown). The shape of the head 240 may be chosen to accommodate any given external actuator. A non-cylindrical shape is desired in order to obtain a positive slippage-free rotation. In this manner, the external actuator, having a correspondingly shaped connecting structure, can be used to rotate shaft 22.

As shown in FIG. 4, shaft 22, with the exception of head 240, is cylindrical in shape. Shaft 22 has a constant radius extending from the head 240 which widens in a step fashion at shoulder 23 as shown and continues downwards through the shaft bore 3 into the internal cavity 200 of the shuttle valve 100. At its point of entry into the internal cavity 200, shaft 22 tapers to a reduced radius. As described before, shaft 22 has a bore extending from its lower end upwards to receive bolt 180 which connects the hub 83 of lever 82 to the shaft 22. Further, shaft 22 has a key 87 attached thereto which fits within slots 196 and 197 of shaft 22 and hub 83, respectively, so as to key the rotation of the hub 83 and lever 82 to the rotation of the shaft 22. The top portion of shaft 22 is threaded in the preferred embodiment so as to receive nuts 521 and 527 as will be described in more detail below.

The shuttle valve 100 also comprises a shaft support structure which is referenced generally by the reference numeral 400. Shaft support structure 400 provides upper guidance support for the shaft 22, and further houses an indicator 525 which provides an indication of which flow passage, 15 or 25, is active or presently being utilized to convey the fluid or gas through the shuttle valve 100. Referring once again to FIG. 4, support structure 400 comprises mounting bracket 310 which is preferably concentrically located about shaft 22. Mounting bracket 35.0 is mounted to valve housing 1 and has attached thereto a packing follower 210 which serves to adjust compression on packing elements 206 which seals shaft 22.

As illustrated in FIG. 4, valve housing 1 has recesses 311 on its top outer structure. Mounting bracket 310 has flanges 312 which fit within recesses 311 so as to provide an area for connection of the mounting bracket 310 to the valve housing 1. It should be noted that follower 210 is preferably concentrically located about the shaft 22 also.

Follower 210 extends, with proper clearance, from the sides of mounting bracket 310 as shown in FIG. 4 inward towards the shaft 22. As illustrated in FIG. 4, the inner diameter of follower 210 is chosen to be slightly larger than the diameter of shaft 22 so as to facilitate the problem-free rotation of the shaft 22 therein while providing proper sealing load to packing 206. The inner diameter of follower 210 decreases at region 215. At this region, the shaft 22 fits more snugly within follower 210, but is still freely rotatable therein. Follower 210 fits within shaft bore 3 of the valve housing 1, as shown. In this manner, follower 210 provides a compressive packing load and does not compromise the rotation of shaft 22. Valve housing 1 has bores 320 extending downward from the top of recess 311 into the valve housing 1. Mounting bracket 310 and follower 210 have bores therein which correspond to the bores 320 in valve housing 1.

Mounting rods 380 which are threaded either in sections or along their entire length are utilized to connect the mounting bracket 310 and the follower 210 to the valve housing 1. Separate nuts 216 are utilized to secure separately the follower 210 and the mounting bracket 310 to the valve housing 1 as illustrated in FIG. 4. The top side of mounting bracket 310 has a bore 340 located therein to allow the passage therethrough of shaft 22.

Beneath the follower 210 in the shaft bore 3 are situated a series of packing elements 206 which may be graphoil seals which are self-lubricating and which serve to provide a seal in the shaft bore 3 and further to lubricate the shaft 22 during rotation of the shaft 22 within shaft bore 3. Alternatively, O-ring seals (not shown) may be used for packing elements 206. Lower bearing 204 is located beneath the packing elements 206 and between the shaft 22 and the inside of shaft bore 3.

Bearing 229 is located between the shoulder 33 of the shaft 22 and the underside of the mounting bracket 310 as shown in FIG. 4. Shoulder 33 of shaft 22 serves as a safety mechanism to prevent the shaft 22 from moving out of the inner cavity 200. Also, bearing 229, provides a means by which to allow the problem-free rotation of the shaft 22 in this region. Shim 23, located between shoulder 33 and the underside of bracket 310, allows for tolerance adjustment during assembly.

The top of mounting bracket 310 has a circular recess 315. Thrust washer 520 is located atop the mounting bracket 310 and within recess 315. Bushing 520 is loaded by a nut 521, which is threadedly connected to shaft 22 in order to prevent the downward motion of the shaft 22 further into the internal cavity 200. Nut 521 is isolated from thrust washer 520 by lockwasher 667 which is keyed to the shaft 22 to prevent its unwanted loosening. It should be noted that the shaft 22 is threaded at its top portion, at least along a sufficient length so as to accommodate nut 521, indicator 525, and nut 527 as will be described below.

FIG. 4A illustrates an enlarged view of the top portion of the shuttle valve 100. As noted earlier, the valve shaft 22 is rotated by a suitable external actuator (not shown) which is connected to head 240. For sideloads, the shaft 22 is supported by bearing 204 (shown in FIG. 4) which is pressed into the shaft bore 3 on its lower end and by bearing 340 (shown in FIG. 4A) which is mounted in bracket 310 on its upper end. Referring once again to FIG. 4A, the vertically upward movement of the shaft 22 is controlled by the shoulder contacting shim 229 and bearing 340 if such a control is desired. Bearing 340, which may be a flanged bearing, is mounted by a light press fit into bracket 310. The mounting bracket 310 is in turn bolted to the valve housing 1 as shown in FIG. 4. The downward movement of the shaft 22 is controlled by the thrust washer 520 which is located on the top face of the mounting bracket 310 and is prevented from rotating by pin 526 which is driven into bore 539 located in mounting bracket 310. A lock-washer 667 has a bent-up tab that fits into a keyway 666 as shown in FIG. 4A which constrains the lockwasher 667 to move with the shaft 22. In this manner, there is no tendency for the lock nut 521 to be moved on the threaded shaft 22 when the shaft 22 is rotated.

Nut 521 is threaded onto to the shaft 22 and is tightened until all end play of shaft 22 is removed. Indicator 525 is placed on the shaft 22 and properly positioned thereon by key 535 as will be described in more detail below. An upper nut 527 is then threaded onto the shaft 22 and tightened so as to secure the indicator 525.

The shaft 22 has a shaft slot 29 (dotted line) which extends therethrough. The shaft slot 29 is preferably rectangular and receives a key 535 which also coacts into a key slot 668 in the indicator 525. While the indicator 525 extends from one side of the shaft 22, a small portion of the indicator 525 extends from the opposite side of the shaft slot 29. Indicator 525 is keyed to the rotation of the shaft 22 via the insertion of key 535 into the shaft slot 29 and into the key slot 668 of the indicator 525 and serves to indicate which side arm A or B of shuttle valve 100 has an active flow passage.

Indicator 525 has an indication marking 545 on its top side which provides the indication described above. Indicator 525 is prevented from traveling downwards towards the valve housing 1 by thrust washer 520 which only allows a pre-determined vertical displacement of the indicator 525 as well as the shaft 22 itself. Further, the indicator 525 has a bore 546 located therethrough and the mounting bracket 310 has a corresponding bore 547 located therein as shown in FIG. 4A. An indicator locking pin (not shown) may be inserted through bore 546 and into the corresponding bore 547 so as to effect the locking of a given flow direction of the shuttle valve as will be described below.

FIG. 5 illustrates a top view of the mounting bracket 310. Stops 600 are provided at each side of the mounting bracket 310 to stop the rotation of the indicator 525 and the shaft 22 at 180°. The stops 600 are mounted on stop bracket 601 which is mounted to the mounting bracket 310 by bolts 297 and nuts 298.

FIG. 5 further illustrates the stops 600 in conjunction with the stop bracket 601, the bolts 297 and nuts 298 and the mounting bracket 310. FIG. 5 also illustrates the stop head 602 which may be a nut screwed onto a threaded portion of stop 600 which is used to retain the stop 600 in a pre-determined position. As seen in FIG. 5, the indicator 525 also has a marking "Active" located thereon so as to indicate the side of the shuttle valve which is active. Further, bore 546 may be employed to coact with a locking device (not shown) such as a padlock or other safety device so as to prevent the unauthorized rotation of the shuttle valve 100. In FIG. 5, the indicator 525 shows that side arm A, in this instance, is active and that fluid or gas is allowed to flow through the flow passage 15 located within side arm A.

Referring to FIG. 6A, which is a diagrammatic view of the shuttle valve 100 taken along the line A'—A' in FIG. 4, the structure of the shuttle valve 100 will be further described. Point 88 is the center point of the axis of rotation of shaft 22. Point 76 is the center point of a phantom sphere which is defined by the spherical surface 34 of the valve disk 74. Note that the points 88 and 76 are not coincidental with one another but are rather, eccentric, or displaced from one another, by a distance X. FIG. 6A illustrates the layout of the shuttle valve 100 which requires less than 180° rotation. For clarity, only 170° rotation of shaft 22 is needed in order to rotate the valve disk 74 from flow passageway 15 to flow passageway 25, or vice versa, as shown. It should be noted that only 170° is needed to effect rotation and to effect the proper seating of the valve disk 74. It should also be noted that, in this embodiment, a perfect alignment of the flow elbow 150 with flow passages 25 and 15, whichever the case may be, may not be entirely possible.

Since 170° actuators are not commonly available and since flow elbow alignment is most desirable, it is preferable to provide an alternate embodiment which is illustrated in FIG. 6B wherein a valve disk 74 is provided which has a larger diameter so that there will exist a greater valve disk 74 to seating surface 36, 38 overlay. This design facilitates the use of a 180° actuator as the larger diameter of valve disk 74 assures proper closure at seating surfaces 36 and 38.

The operation of the shuttle valve 100 will now be described in detail in conjunction with FIGS. 4, 4A, 5, 6A and 6B. The shuttle valve 100 is typically connected to an external system such as a fluid or gas transport system, with inlet (outlet) 10 and outlets (inlets) 20 and 30 connected to their respective external counterparts (not shown). An external actuator (not shown) is connected to the head 240 of the shaft 22. Initially, the shuttle valve 100 is set up to provide the flow of a fluid or a gas through one of either flow passage 15 or flow passage 25.

In FIG. 4, flow passage 25 is chosen to provide fluid or gas flow while flow passage 15 is sealed off or closed by valve disk 74. Rotation of the external actuator and the shaft 22 is chosen so that the rotation of the valve disk 74 will be limited to movement from one flow passage to the other and within one hemisphere of the internal cavity 200. In a typical operation, the valve disk 74 may be initially seated in one flow passage, for example flow passage 15 of side arm A, and the flow elbow 150 is initially aligned or oriented so as to direct the flow of a fluid or a gas to flow passage 25 of side arm B. When it is desired to utilize the shuttle valve 100 to change the flow of fluid or gas from one flow passage to the other, the external actuator (not shown) is actuated either automatically or manually and rotates the shaft 22 in either a clockwise or a counter-clockwise direction of rotation as required. While it does not matter which direction is chosen, the valve disk 74 and the flow elbow 150 must have their field of rotation limited to 180°. As an example, rotation of disk 74 must be within the arc Z-Z, shown in FIG. 6B. In this manner, the external actuator must be able to rotate 180° in both the clockwise and the counter-clockwise directions.

When shaft 22 is rotated by the external actuator, the valve disk 74 becomes unseated from seat 36 at flow passage 15 and begins to rotate within the inner cavity 200. As valve disk 74 rotates, the flow elbow 150 also rotates in the same direction as a result of being mechanically linked with the valve disk 74 via valve shaft 80 and connector structure 155. This combined simultaneous movement results in the rotation of the flow elbow 150 towards the flow passage 15 previously sealed off by the valve disk 74. The shaft 22 will rotate and continue to cause the rotation of the valve disk 74 and the flow elbow 150 combination until the spherical surface 34 of the valve disk 74 comes into contact with the seating surface 38 adjacent the flow passage 25 which is to be sealed off or closed.

At this point, a major inventive feature of the present invention, namely the eccentricity of the axis of rotation 88 of the shaft 22 and the center point 76 of the phantom sphere defined by the spherical seating surface 34 of the valve disk 74, is utilized. The utility of the eccentricity of the point locations 88 and 76, corresponding to the axis of rotation of the shaft 22 and the center of the phantom sphere 76, defined by the valve disk's spherical surface 34, respectively, will be described in the following manner.

When the spherical surface 34 of the valve disk 74 comes into contact with the spherical seating surface 38 adjacent flow passage 25, which is to be sealed, it will come to rest thereupon. Due to the eccentricity of the axis of rotation of the shaft 22 at point 88 and the center point 76, of the phantom sphere, defined by the disk's spherical seating surface 34, further rotation of shaft 22 is impossible due to triangulation. The further application of actuator torque upon the shaft 22 will serve to increase seat loading. The applied torque converts to a drag plus a seating force which is perpendicular to the valve disk 74 and which will serve to direct the valve disk 74 further towards the seating surface 38 adjacent flow passage 25. The valve disk 74 will swivel or be articulated during this seating approach until the alignment between the spherical surface 34 of the valve disk 74 and the spherical seating surface 38 for flow passage 25 is perfected. This aligned or perfected seating thereby prevents the flow of fluid or gas through the sealed off or closed flow passage 25. Simultaneously with this action, the flow elbow 150 will rotate towards and come into alignment with the opposite flow passage 15. In this manner, the shuttle valve 100 provides the change of direction of the flow of a fluid or a gas from and between flow passages 15 and 25 with a minimal pressure drop or pressure loss occurring therethrough.

As the shaft 22 rotates from one extreme location to the other extreme location, indicator 525 also rotates. Indicator 525 provides an indication of which flow passage is open or active. The spherical surface 34 of the valve disk 74 coacts with the spherical seating surfaces 36 and 38 so as to provide a primary stop of the rotation of the valve disk 74 and the flow elbow 150 assembly. Further, stops 600 serve as secondary stops so as to prevent the excessive rotation of indicator 525, and with it, shaft 22 as indicator 525 coacts with key 535 which extends through slot 29 of shaft 22 and slot 668 of the indicator 525. In this manner, the rotation of the indicator 525 is keyed to the rotation of the shaft 22. By limiting the rotational movement of the indicator 525 and the rotation of the shaft 22, the rotation of the valve disk 74 and the flow elbow 150 will also be limited. Due to the secondary stop function of the stops 600, both the indicator 525 and the shaft 22 will only be rotatable by a maximum of 180°. Further, proper disk location is assured by shimming via the valve shim 84 associated with valve disk shaft 80 and shim 23 associated with the shaft 22.

Further, if an indicator locking pin (not shown) is inserted through bore 546 of the indicator 525 and into the corresponding bore 547 of the mounting bracket 301, the shuttle valve 100 will be locked in its current position. This precludes the unauthorized tampering with the shuttle valve 100. The above described process is repeated in the opposite direction when it is desired to once again change the direction of flow from one flow passage to the opposite flow passage.

Figure 7:
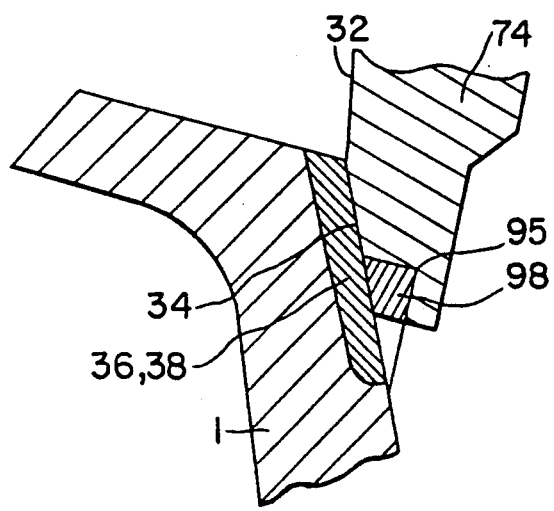
FIG. 7 illustrates an alternate embodiment for the valve disk of the shuttle valve of the present invention wherein a circular ring is utilized to provide an improved sealing capability.

FIG. 7 illustrates an alternate embodiment and/or modification of a disk valve 74 wherein a circular ring 98 (shown in cross section) is inserted within a circular groove 95 which is located on the disk face 34 which is chosen to be adjacent the seating surfaces 36 or 38 when the valve disk 74 is seated therewith. The circular ring 98 is a soft material and can be an elastomer or a plastic such as teflon or rubber. The circular ring 98 is retained in groove 95 of the disk 74 by the disk being bent so as to securely retain ring 98 therein. Circular ring 98, by nature of its resilience, provides greater sealing capabilities for the valve disk 74.

Figure 8:
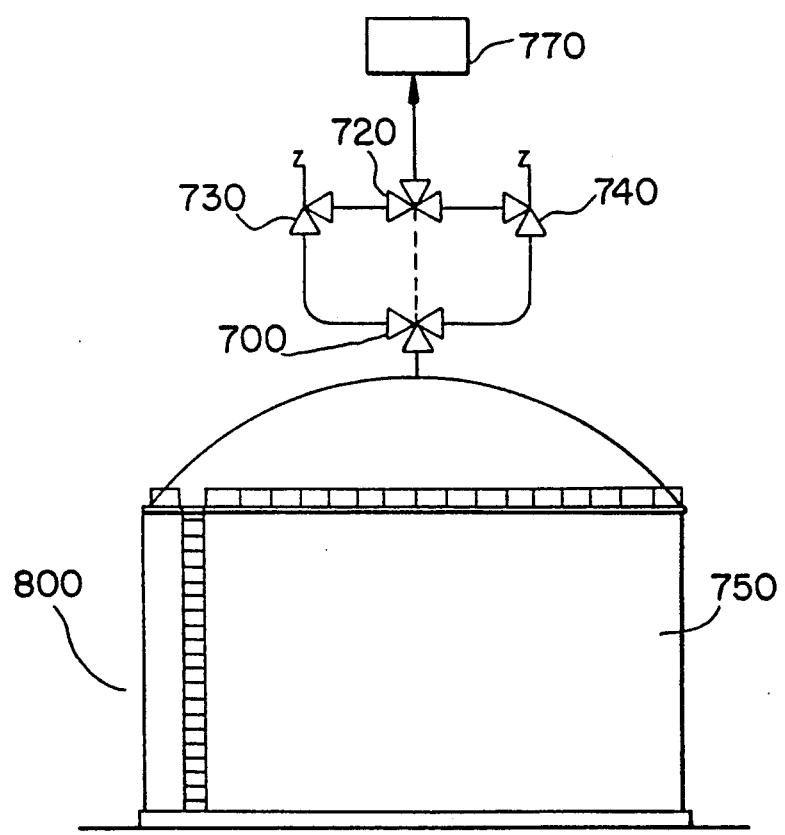
FIG. 8 illustrates a typical installation system wherein the shuttle valve of the present invention may be utilized.

FIG. 8 illustrates a typical installation system 800 wherein the shuttle valve of the present invention may be utilized. Storage tank 750 may contain a fluid or a gas. Valves 700 and 720 are shuttle valves of the present invention. The shuttle valve 700 may either allow the selection of safety valve 730 to the left or safety valve 740 to the right. Shuttle valve 720 is a second shuttle valve which is similar to shuttle valve 700. The shafts 22 of shuttle valves 700 and 720 are rotatably connected to one another.

Device 770, which may be a scrubber or an exhaust in a safety system, is connected to shuttle valve 720. During the operation of the installation system 800, if shuttle valve 700 selects safety valve 730, then shuttle valve 720 is connected so as to properly connect safety valve 730 to device 770. During this mode of operation, safety valve 740 is not utilized and may be removed for service or replacement. Similarly, safety valve 740 may be selected by shuttle valves 700 and 720. Typically, shuttle valves 700 and 720 are mechanically connected to one another so that their operation is linked together and coincides with one another.

The moving parts in the shuttle valve 100 described herein may be manufactured from any material suitable for the intended purpose. Steel, stainless steel, aluminum and plastic, etc., are all suitable materials depending upon the application or use intended. For example, aluminum would be a viable choice in very large low pressure cryogenic tanks because it is light, cheap, and suitable for cryogenic applications. In some instances, codes and regulations of the locality might dictate the materials to be used in these shuttle valves.

The shuttle valve 100 of the present invention may have other applications. For example, it may be utilized as a diverter valve which selects one of two chambers which an inlet or an outlet may be connected to. In this manner, the shuttle valve may allow toggling between the two chambers.

In another embodiment of the present invention, the flow elbow 150 could be removed and the valve disk 74 can be made to rotate to a position in between the flow passages 15 and 25 so as to block neither flow passage. In this manner, both flow passages could be made active. In this embodiment, however, since the fluid or gas could enter the inner cavity 200 and come into contact with the moving parts therein, pressure losses would be increased. If the reduced pressure that results therefrom is tolerable, the present invention could be so utilized. This alternate embodiment would require a 180° actuator with a stop at 90° which would be employed to stop the valve disk 74 in between the two flow passages 15 and 25. This alternate embodiment, in effect, would allow the dual activation of both flow passages in addition to the normal shuttle valve operation wherein only one flow passage is opened or made active.

An important advantage of the present invention lies in the fact that the inner parts within the internal cavity 200 are designed so as to be small enough that they can be inserted into and therein assembled via inlet (outlet) 10. It is only required that nozzle 172 be removed so as to allow access to the internal cavity 200. Once insertion or assembly of the inner parts, including flow elbow 150, has been accomplished, nozzle 172 can be replaced and the shuttle valve 100 will be in a condition for operation. This leads to enormous cost and manufacturing advantages as the valve housing 1 may be manufactured in one piece while all further assembly can be performed inside the internal cavity via inlet (outlet) 10. This design also facilitates cheaper maintenance costs for these shuttle valves.

While the present invention has been described in various preferred embodiments, such descriptions are merely illustrative of the present invention and are not meant to be a limitation thereof. In this regard, the present invention is meant to encompass all modifications and/or variations with the scope of the present invention limited only by the claims which follow.

I claim:

1. A shuttle valve, comprising:
   a valve housing which further comprises:
   at least one inlet aperture;
   at least two outlet apertures, wherein each of said at least two outlet apertures has associated therewith a flow passage,
   and further wherein said valve housing has an inner cavity located therewithin which has seating surfaces located adjacent each of said flow passages;
   a valve assembly, wherein said valve assembly is located in said inner cavity of said valve housing, and wherein said valve assembly further comprises:
   a valve disk, wherein said valve disk has a spherical surface, at least in part, wherein said spherical surface defines a sphere which has a center point, and further wherein said center point defines a first point location;
   a valve shaft assembly which further comprises:
   a valve shaft, and further wherein said valve shaft rotates about an axis of rotation
   wherein a horizontal plane is defined by a plane which is perpendicular to said axis of rotation of said valve shaft, and which passes through said first point location, wherein said first point location defines a first point location on said horizontal plane, and further wherein said point of intersection of said axis of rotation of said valve shaft and said horizontal plane defines a second point location on said horizontal plane;
   wherein said first point location and said second point location are at least one of eccentric with one another and displaced from one another on said horizontal plane;
   wherein said valve shaft assembly controls the rotation of said valve assembly, and further wherein the actuation of said valve shaft assembly causes the rotation of said valve assembly within said inner cavity of said valve housing so as to rotate said valve disk from a first flow passage to a second flow passage;
   wherein said spherical surface of said valve disk contacts said seating surfaces which are adjacent said second flow passage, and further wherein a continued actuation of said valve shaft assembly in conjunction with said first point location and said second point location being said at least one of eccentric with one another and displaced from one another on said horizontal plane, perfects a seating between said spherical surfaces of said valve disk and said seating surfaces adjacent said second flow passage.

2. The shuttle valve of claim 1, wherein said valve housing further comprises a connecting means for connecting said shuttle valve to an external system.

3. The shuttle valve of claim 1, wherein said valve disk and said flow directing element are located 180° from one another.

4. The shuttle valve of claim 1, wherein said spherical surface of said valve disk corresponds to said seating surfaces adjacent said flow passage.

5. The shuttle valve of claim 1, wherein no more than 180° of rotation of said valve assembly is required to effect said rotation of said valve disk and to perfect a seating between said spherical surfaces of said valve disk and said seating surfaces adjacent said flow passage.

6. The shuttle valve of claim 1, wherein said valve housing is composed of one of steel, stainless steel, aluminum, and plastic.

7. The shuttle valve of claim 1, wherein said valve housing has a Y-shape.

8. The shuttle valve of claim 1, wherein said valve housing further comprises pressure relief ports for receiving pressure relief plugs.

9. The shuttle valve of claim 1, further comprising a nozzle associated with at least one of said at least one inlet aperture and said at least one outlet aperture.

10. The shuttle valve of claim 1, wherein said flow directing element is seated within a nozzle which is associated with at least one of said at least one inlet aperture and said at least one outlet aperture.

11. The shuttle valve of claim 1, further comprising an articulation means wherein said valve disk is connected to said articulation means, and further wherein said articulation means facilitates at least one of movement and angular rotation of said valve disk.

12. The shuttle valve of claim 1, further comprising a safety means for preventing an inadvertent ejection of said valve shaft from said shuttle valve.

13. The shuttle valve of claim 1, wherein said shaft has a head which is of a non-cylindrical shape.

14. The shuttle valve of claim 1, which further comprises a shaft support structure.

15. The shuttle valve of claim 1, wherein said shuttle valve further comprises an indicating means for providing an indication of which flow passage is being utilized.

16. The shuttle valve of claim 15, wherein said indicating means is keyed to the rotation of said shaft.

17. The shuttle valve of claim 1, wherein said shuttle valve further comprises a mounting bracket wherein said mounting bracket is mounted to said valve housing, and further wherein said mounting bracket has attached thereto a packing means for adjusting compression on packing elements which seal said shaft.

18. The shuttle valve of claim 1, wherein said packing elements are at least one of self-lubricating elements, graphoil seals and O-ring seals.

19. The shuttle valve of claim 1, wherein said shuttle valve comprises means for at least one of preventing said shaft from moving out of said inner cavity and for preventing a downward motion of said shaft into said inner cavity.

20. The shuttle valve of claim 1, further comprising a locking means for effecting a locking of said shuttle valve in a given flow direction.

21. The shuttle valve of claim 1, further comprising a stopping means for limiting the rotation of said shaft to 180°.

22. The shuttle valve of claim 1, wherein said valve disk has a disk face which has a circular groove located therein, and further wherein a circular ring is inserted within said circular groove, and further wherein said circular groove is chosen to be adjacent said seating surface adjacent said flow passage.

23. The shuttle valve of claim 22, wherein said circular ring is composed of one of an elastomeric material, a plastic material, a teflon material, and a rubber material.

24. The shuttle valve of claim 1, wherein said valve disk has a diameter which is larger than the diameter of said second flow passage so as to enable a sealing to be effected with a 180° rotation.

25. The shuttle valve of claim 1, wherein said valve assembly may be assembled within said inner cavity of said valve housing.

26. A shuttle valve, comprising:
a valve housing which further comprises:
at least one inlet aperture; and
at least two outlet apertures, wherein each of said at least two outlet apertures has associated therewith a flow passage,
and further wherein said valve housing has an inner cavity located therewithin which has spherical seating surfaces located adjacent each of said flow passages;
a valve assembly wherein said valve assembly is located in said inner cavity of said valve housing and wherein said valve assembly further comprises:
a valve disk wherein said valve disk has a spherical surface, at least in part, and wherein said spherical surface defines a sphere which has a center point, and further wherein said center point defines a first point location, and
a flow directing element, wherein said flow directing element is rotatably seated within said valve housing and is rotatable without a prior displacement, and further wherein said flow directing element is connectably attached with said valve disk so that said flow directing element and said valve disk rotate simultaneously with one another;
a valve shaft assembly which further comprises:
a valve shaft, wherein said valve shaft extends from said inner cavity to the exterior of said valve housing, and further wherein said valve shaft rotates about an axis of rotation, wherein a horizontal plane is defined by a plane which is perpendicular to said axis of rotation of said valve shaft, and which passes through said first point location, wherein said first point location defines a first point location on said horizontal plane, and further wherein said point of intersection of said axis of rotation of said valve shaft and said horizontal plane defines a second point location on said horizontal plane, wherein said first point location and said second point location are at least one of eccentric with one another and displaced from one another on said horizontal plane; and further wherein said valve shaft assembly is connectably attached with said valve assembly so that said valve shaft assembly controls a rotation of said valve assembly, and further wherein the actuation of said valve shaft assembly causes the rotation of said valve assembly within said inner cavity of said valve housing so as to rotate said valve disk from a first flow passage to a second flow passage;
and further wherein a continued actuation of said valve shaft assembly, along with said first point location and said second point location being at least one of eccentric with one another and displaced from one another on said horizontal plane, provides a seating force, wherein said seating force perfects a seating between said spherical surface of said valve disk and said spherical seating surfaces adjacent said second flow passage.

27. A shuttle valve, comprising:
a valve housing which further comprises:
at least one inlet aperture;
at least two outlet apertures, wherein each of said at least two outlet apertures has associated therewith a flow passage, and further wherein said valve housing has an inner cavity located therewithin which has seating surfaces located adjacent each of said flow passages;
a valve assembly, wherein said valve assembly is located in said inner cavity of said valve housing, and wherein said valve assembly further comprises:
a valve disk, wherein said valve disk is articulated and wherein said valve disk has a spherical surface, at least in part, wherein said spherical surface defines a sphere which has a center point, and further wherein said center point defines a first point location;
a flow directing element, wherein said flow directing element is connectably attached with said valve disk so that said flow directing element and said valve disk rotate together with one another;
a valve shaft, and further wherein said valve shaft rotates about an axis of rotation;

wherein a horizontal plane is defined by a plane which is perpendicular to said axis of rotation of said valve shaft, and which passes through said first point location, wherein said first point location defines a first point location on said horizontal plane, and further wherein said point of intersection of said axis of rotation of said valve shaft and said horizontal plane defines a second point location on said horizontal plane;

wherein said first point location and said second point location are at least one of eccentric with one another and displaced from one another on said horizontal plane;

wherein said valve shaft assembly controls the rotation of said valve assembly, and further wherein the actuation of said valve shaft assembly causes the rotation of said valve assembly within said inner cavity of said valve housing so as to rotate said valve disk from a first flow passage to a second flow passage;

wherein said spherical surface of said valve disk contacts said seating surfaces which are adjacent said second flow passage, and further wherein a continued actuation of said valve shaft assembly in conjunction with said first point location and said second point location being said at least one of eccentric with one another and displaced from one another on said horizontal plane, perfects a seating between said spherical surfaces of said valve disk and said seating surfaces adjacent said second flow passage.

* * * * *

UNITED STATES PATENT AND TRADEMARK OFFICE
CERTIFICATE OF CORRECTION

PATENT NO : 5,329,968
DATED : July 19, 1994
INVENTOR(S) : Walter W. Powell

It is certified that error appears in the above-identified patent and that said Letters Patent is hereby corrected as shown below:

The title page, showing the illustrative figure should be deleted to appear as per the attached title page.

Figures 4, 4A and 5 of the drawings should be deleted to be replaced with Figures 4, 4A and 5 as shown on the attached sheets.

Signed and Sealed this

Twenty-first Day of March, 1995

Attest:

BRUCE LEHMAN

Attesting Officer     Commissioner of Patents and Trademarks

United States Patent [19]
Powell

[11] Patent Number: 5,329,968
[45] Date of Patent: Jul. 19, 1994

[54] SHUTTLE VALVE

[75] Inventor: Walter W. Powell, Sugar Land, Tex.

[73] Assignee: KWW Gesellschaft für Verfahrenstechnik mbH, Düsseldorf, Fed. Rep. of Germany

[21] Appl. No.: 906,152

[22] Filed: Jun. 29, 1992

[51] Int. Cl.$^5$ ............................................. F16K 11/02
[52] U.S. Cl. .............................. 137/625.46; 137/274; 137/276; 251/192; 251/160
[58] Field of Search ............... 137/872, 874, 625.46, 137/876; 251/192, 160, 298, 86

[56] References Cited
U.S. PATENT DOCUMENTS

| | | | |
|---|---|---|---|
| 3,575,376 | 4/1971 | Arvidson | 251/160 X |
| 4,074,889 | 2/1978 | Engel | 251/298 |
| 4,403,626 | 9/1983 | Paul | 137/876 X |
| 4,821,772 | 4/1989 | Anderson | 137/874 X |

*Primary Examiner*—Gerald A. Michalsky
*Assistant Examiner*—Thomas M. Sember
*Attorney, Agent, or Firm*—Anderson Kill Olick & Oshinsky

[57] ABSTRACT

A shuttle valve is described which comprises a valve housing having an inlet and a plurality of outlets. An inner valve assembly is located within an internal cavity which is actuated by a shaft which extends from the internal cavity to a point external from the valve housing. The inner valve assembly comprises a valve disk having a surface which is spherical, at least in part, and a flow elbow, which is located 180° away from the face of the valve disk. The valve disk and the flow elbow are connected to one another and to the shaft. The valve disk is further articulatable. The point which defines the axis of rotation of the shaft and the center point of a phantom sphere defined by the spherical surface of the valve disk, are eccentric, or displaced from one another. Upon the rotation of the valve disk and its contact with a seating surface adjacent the flow passage to be shut off or closed, the eccentricity of the shaft axis and the center point of the phantom sphere creates a torque, upon the continued rotation of the shaft, which is applied to the valve disk and which serves to increase the seating load of the valve disk so as to perfect the seating of the valve disk against the spherical seating surfaces adjacent the flow passage.

27 Claims, 8 Drawing Sheets

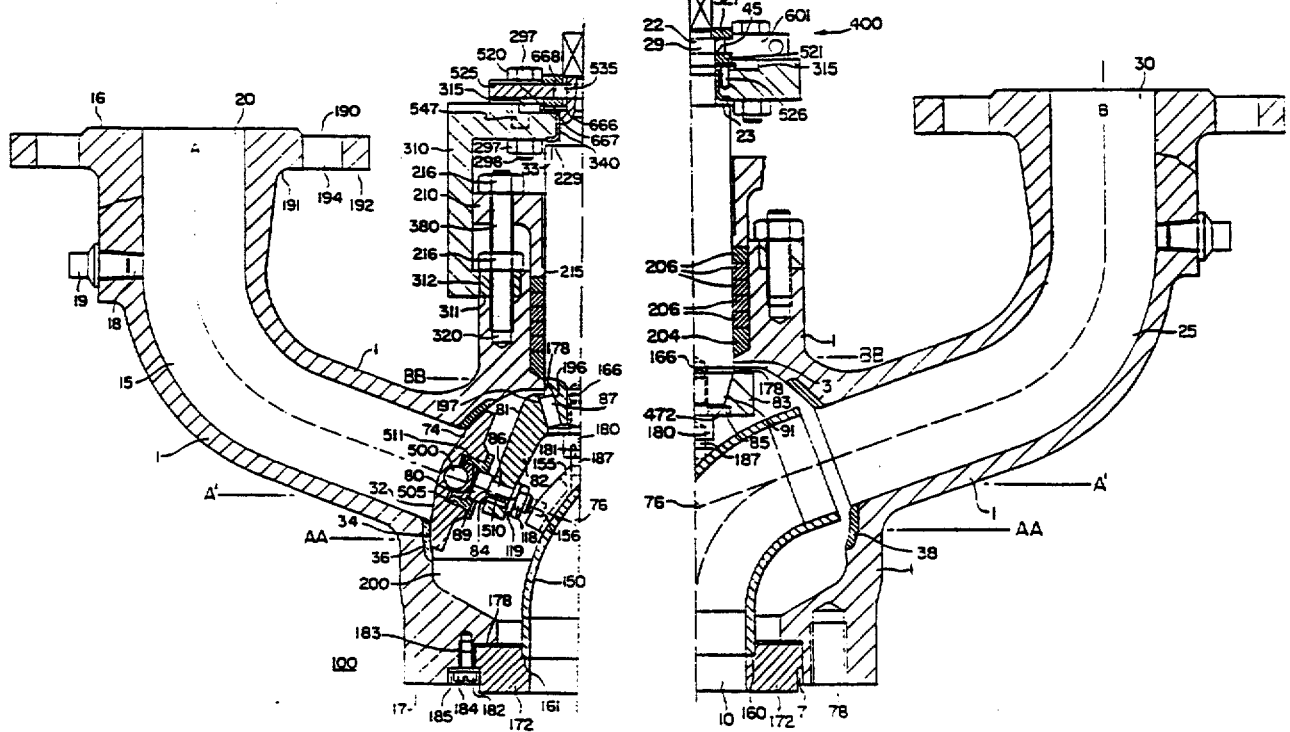

UNITED STATES PATENT AND TRADEMARK OFFICE
CERTIFICATE OF CORRECTION

PATENT NO. : 5,329,968  Page 3 of 7
DATED : July 19, 1994
INVENTOR(S) : Walter W. Powell It is certified that error appears in the above—identified patent and that said Letters Patent is hereby corrected as shown below:

FIG. 4A

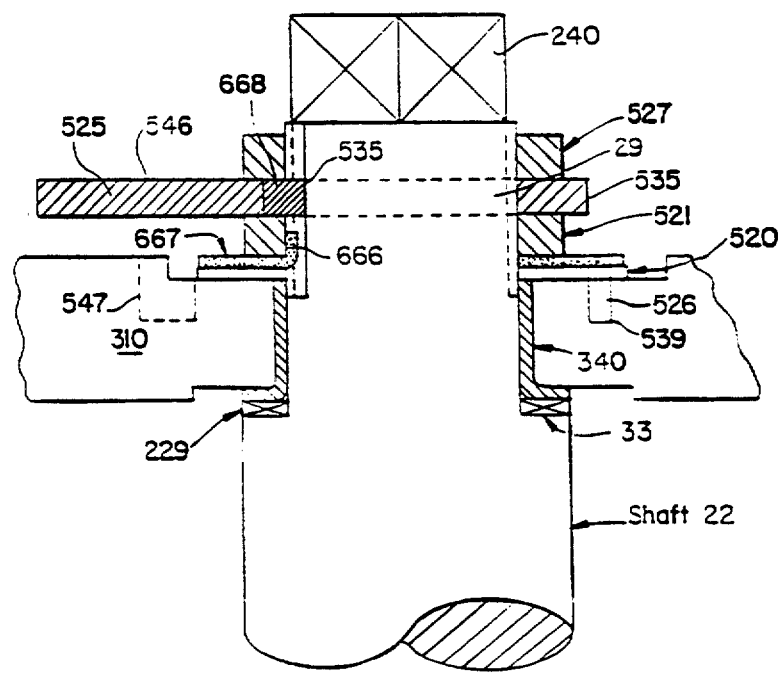

UNITED STATES PATENT AND TRADEMARK OFFICE
CERTIFICATE OF CORRECTION

PATENT NO. : 5,329,968

DATED : July 19, 1994

INVENTOR(S) : Walter W. Powell

It is certified that error appears in the above—identified patent and that said Letters Patent is hereby corrected as shown below:

FIG. 4

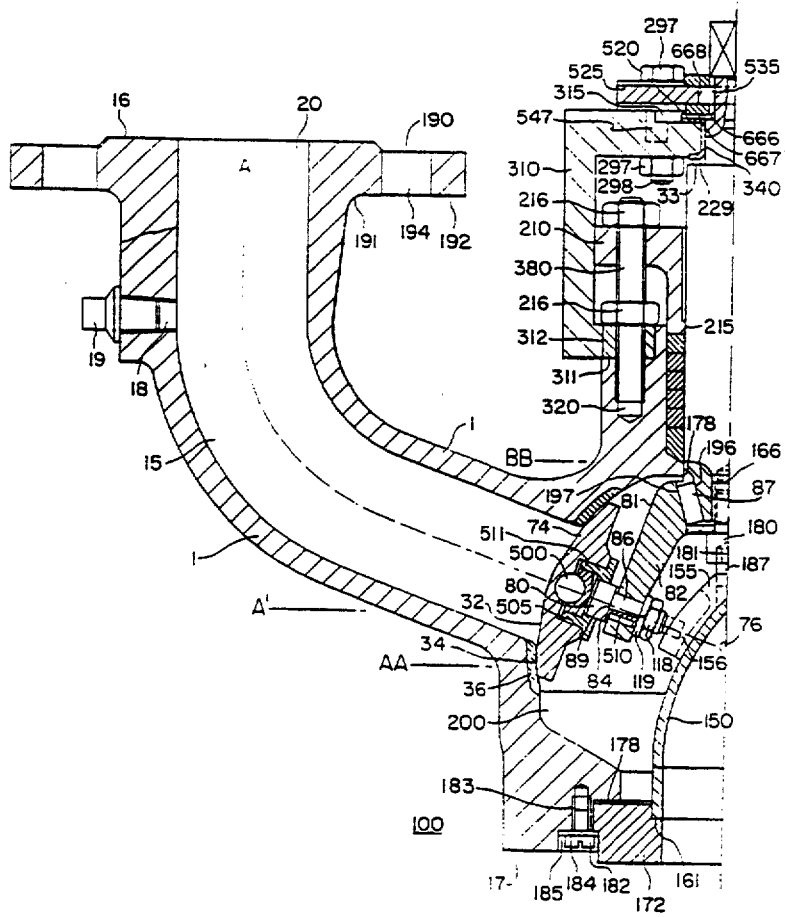

UNITED STATES PATENT AND TRADEMARK OFFICE
CERTIFICATE OF CORRECTION

PATENT NO. : 5,329,968
DATED : July 19, 1994
INVENTOR(S) : Walter W. Powell

It is certified that error appears in the above—identified patent and that said Letters Patent is hereby corrected as shown below:

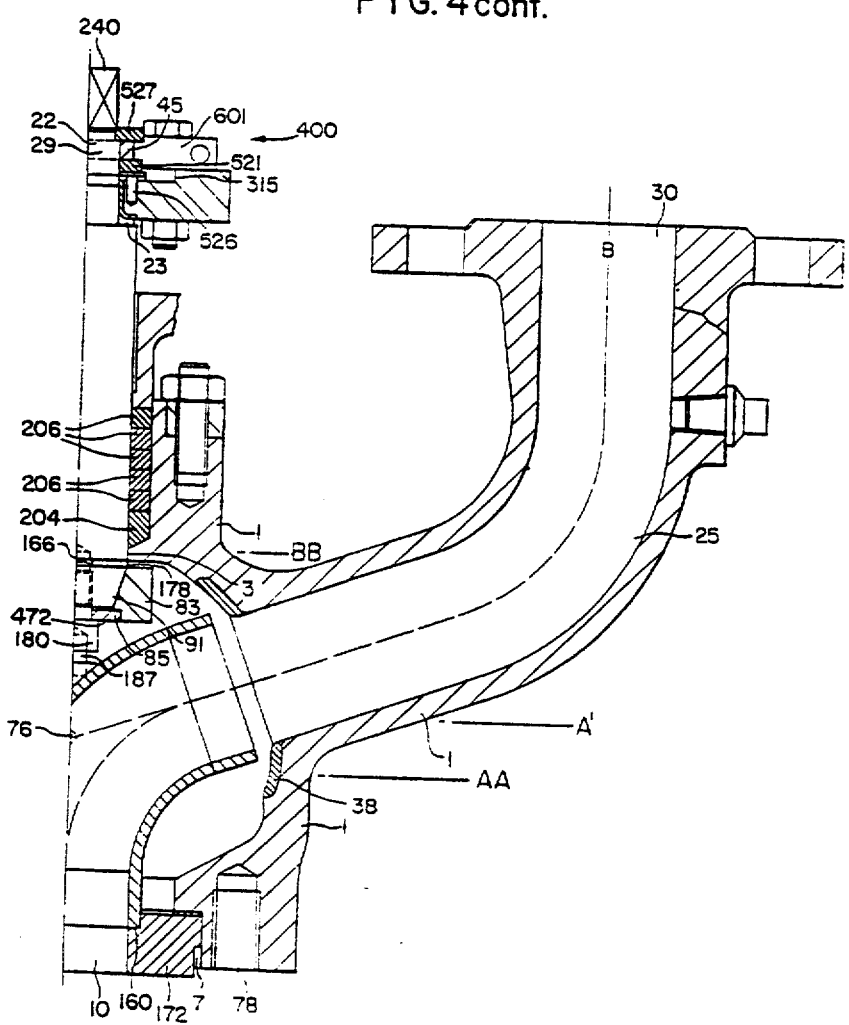

FIG. 4 cont.

UNITED STATES PATENT AND TRADEMARK OFFICE
CERTIFICATE OF CORRECTION

PATENT NO. : 5,329,968  Page 6 of 7
DATED : July 19, 1994
INVENTOR(S) : Walter W. Powell It is certified that error appears in the above-identified patent and that said Letters Patent is hereby corrected as shown below:

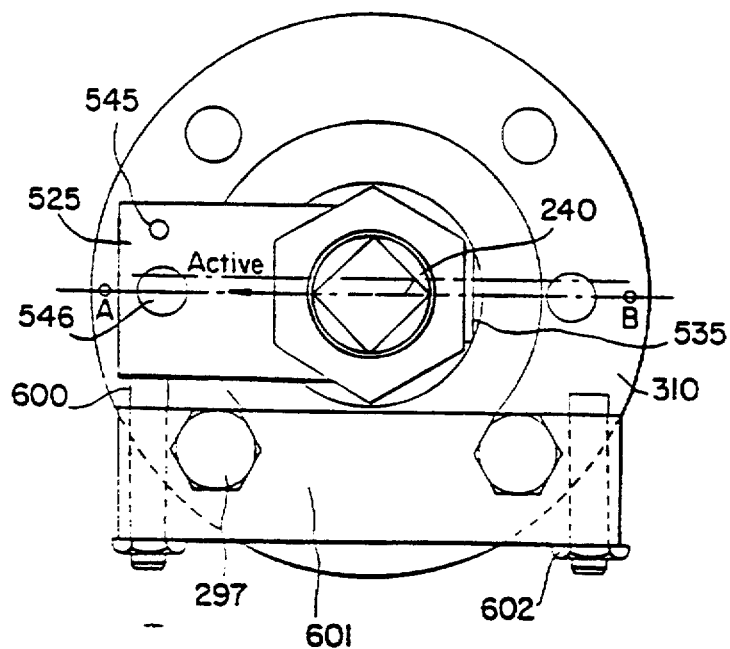

FIG. 5

UNITED STATES PATENT AND TRADEMARK OFFICE
CERTIFICATE OF CORRECTION

PATENT NO. : 5,329,968
DATED : July 19, 1994
INVENTOR(S) : Walter W. Powell

It is certified that error appears in the above—identified patent and that said Letters Patent is hereby corrected as shown below:

Column 8, line 6, "86" should read -- 80 --.

Column 8, line 35, "505" should read -- 511 --.

Column 8, line 49, "157" should read -- 187 --.

Column 8, line 59, "172" should read -- 511 --.

Column 8, line 64, "exits" should read -- exists --.

Column 8, line 66, "172" should read -- 472 --.

Column 9, line 11, "160" should read -- 180 --.

Column 9, line 58, "23" should read as -- 33 --.

Column 11, line 23, "229" should read -- 23 --.